US008493689B2

(12) United States Patent
Virmani et al.

(10) Patent No.: US 8,493,689 B2
(45) Date of Patent: Jul. 23, 2013

(54) PROTECTIVE LAYER ON GIMBAL FOR SCRATCH MITIGATION

(75) Inventors: Manish Virmani, Eden Prairie, MN (US); Paritosh Chandrakant Panchal, Bloomington, MN (US); James Fisher, Chaska, MN (US); Keefe Michael Russell, Robbinsdale, MN (US); Sandeepan Bhattacharya, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 616 days.

(21) Appl. No.: 12/484,828

(22) Filed: Jun. 15, 2009

(65) Prior Publication Data
US 2010/0315745 A1 Dec. 16, 2010

(51) Int. Cl.
G11B 5/48 (2006.01)

(52) U.S. Cl.
USPC ........................................ 360/245.3; 360/245

(58) Field of Classification Search
USPC ............. 360/245.9, 245.8, 245, 245.1, 245.3, 360/245.5, 245.7
See application file for complete search history.

(56) References Cited

U.S. PATENT DOCUMENTS

| | | | |
|---|---|---|---|
| 4,819,094 A * | 4/1989 | Oberg | 360/245.9 |
| 5,107,383 A | 4/1992 | Takeuchi et al. | |
| 5,367,419 A | 11/1994 | Kazama | |
| 5,452,158 A | 9/1995 | Harrison et al. | |
| 5,467,236 A | 11/1995 | Hatannai et al. | |
| 5,473,487 A * | 12/1995 | Nagase | 360/245.6 |
| 5,530,606 A * | 6/1996 | Baasch et al. | 360/245.6 |
| 5,606,477 A * | 2/1997 | Erpelding et al. | 360/244.3 |
| 5,771,135 A * | 6/1998 | Ruiz et al. | 360/244.3 |
| 5,781,378 A | 7/1998 | Heitkamp et al. | |
| 5,796,553 A * | 8/1998 | Tangren | 360/244.9 |
| 5,943,191 A * | 8/1999 | Giere et al. | 360/244.9 |
| 6,005,750 A * | 12/1999 | Willard et al. | 360/244.8 |
| 6,191,915 B1 | 2/2001 | Takagi et al. | |
| 6,201,664 B1 * | 3/2001 | Le et al. | 360/244.9 |
| 6,307,719 B1 | 10/2001 | Mallary | |
| 6,426,851 B1 | 7/2002 | Perez | |
| 6,483,670 B1 | 11/2002 | Watanabe | |
| 6,549,376 B1 | 4/2003 | Scura et al. | |
| 6,587,311 B1 | 7/2003 | Niijima et al. | |
| 6,671,131 B2 | 12/2003 | Kasajima et al. | |
| 6,687,097 B1 * | 2/2004 | Anderson et al. | 360/323 |
| 6,728,073 B1 * | 4/2004 | Budde et al. | 360/245.9 |
| 6,739,958 B2 * | 5/2004 | Chao et al. | 451/288 |
| 6,744,602 B2 | 6/2004 | Rao et al. | |
| 6,781,794 B2 | 8/2004 | Ohwe et al. | |
| 6,801,400 B2 | 10/2004 | Fu et al. | |
| 6,967,821 B2 * | 11/2005 | Himes et al. | 360/245.3 |
| 6,995,952 B2 * | 2/2006 | Feliss et al. | 360/235.3 |
| 7,023,667 B2 * | 4/2006 | Shum | 360/294.3 |
| 7,046,483 B2 | 5/2006 | Erpelding | |
| 7,068,471 B1 * | 6/2006 | Bjorstrom et al. | 360/245.9 |

(Continued)

Primary Examiner — Brian Miller
(74) Attorney, Agent, or Firm — Fredrikson & Byron, P.A.

(57) ABSTRACT

A head gimbal assembly includes a gimbal, a slider, and a polymer layer. The gimbal comprises a metal layer, and the metal layer of the gimbal defines a gimbal mounting portion for attachment to a metallic load beam and a gimbal tongue extending from the gimbal mounting portion. The slider comprises a ceramic material for carrying a transducing head, and at least a portion of the slider is secured to the gimbal tongue. The polymer layer is positioned adjacent to the gimbal and configured for limiting ceramic-to-metal and metal-to-metal contact.

19 Claims, 6 Drawing Sheets

U.S. PATENT DOCUMENTS

| | | | |
|---|---|---|---|
| 7,130,157 | B2 | 10/2006 | Sassine et al. |
| 7,135,203 | B2 * | 11/2006 | Scheibner et al. ........... 427/96.3 |
| 7,283,329 | B2 * | 10/2007 | Feliss et al. ................. 360/235.3 |
| 7,283,332 | B2 | 10/2007 | Weber |
| 7,907,368 | B2 * | 3/2011 | Zeng et al. ................. 360/245.3 |
| 7,907,369 | B1 * | 3/2011 | Pan ............................ 360/264.2 |
| 8,120,881 | B2 * | 2/2012 | Yao ............................ 360/294.4 |
| 2005/0099733 | A1 | 5/2005 | Hagen |
| 2006/0227463 | A1 | 10/2006 | Wright et al. |
| 2006/0274451 | A1 | 12/2006 | Arya |
| 2006/0274452 | A1 | 12/2006 | Arya |
| 2007/0020386 | A1 * | 1/2007 | Bedell et al. ................... 427/128 |
| 2007/0159726 | A1 | 7/2007 | Maslov |
| 2007/0206328 | A1 | 9/2007 | Hagen |
| 2007/0263325 | A1 | 11/2007 | Hanya et al. |
| 2008/0144224 | A1 * | 6/2008 | Yao ............................. 360/245.4 |
| 2008/0180849 | A1 * | 7/2008 | Umemiya et al. ............ 360/240 |
| 2009/0027807 | A1 * | 1/2009 | Yao et al. .................... 360/245.1 |
| 2009/0195919 | A1 * | 8/2009 | Mahadev ........................ 360/86 |

* cited by examiner

PROTECTIVE LAYER ON GIMBAL FOR SCRATCH MITIGATION

BACKGROUND

Hard disc drives (HDDs) typically comprise one or more magnetic media discs or other magnetic storage media, each having concentric data tracks for storing data. Where multiple discs are used, a stack is formed of co-axial discs having generally the same diameter. A transducing head carried by a slider is used to read from and write to a data track on a given disc. The slider is connected to a suspension assembly, which can include a load beam and a gimbal, and the suspension assembly is in turn attached to an actuator arm. The load beam is generally made of a metallic material, typically stainless steel. The gimbal can be a separate metallic element secured to the load beam to support the slider thereon while permitting some movement of the slider, and can also be made of stainless steel. During operation, as the disc spins, the slider glides above the surface of the disc on a small cushion of air. The actuator arm pivots to movably position the slider with respect to the disc. A microactuator assembly can be included to provide additional precision positioning of the suspension assembly. Electrical connections extend along the suspension to electrically connect the transducing head to components located at or near the actuator arm. Those electrical connections can be formed on the suspension itself, or can be located on a separate interconnect structure supported relative to the suspension, such as a flex-on suspension (FOS).

Magnetic storage media can store data as bits with magnetization directions in-plane, or perpendicular to a plane of the media. Greater storage densities can generally be achieved with perpendicular recording.

The transducing head typically includes a writer and a reader. The reader includes a sensor for retrieving magnetically encoded information stored on the disc (or other magnetic storage medium). Magnetic flux from the surface of the disc causes rotation of the magnetization vector of a sensing layer or layers of the sensor, which in turn causes a change in the electrical properties of the sensor that can be detected by passing a current through the sensor and measuring a voltage across the sensor. Depending on the geometry of the sensor, the sense current may be passed in the plane (CIP) of the layers of the sensor or perpendicular to the plane (CPP) of the layers of the sensor. External circuitry then converts the voltage information into an appropriate format and manipulates that information as necessary to recover information encoded on the disc.

The writer, for a perpendicular recording transducing head, typically includes a main pole and a return pole, which are separated from each other at an air bearing surface (ABS) of the transducing head by a gap layer. The main pole and return pole can be connected to each other at a region distal from the ABS by a back gap closer or back via. One or more layers of conductive coils are positioned between the main and return poles, and are encapsulated by electrically insulating layers. The conductive coils can have different configurations, such as helical and pancake configurations. To write data to the disc (or other magnetic storage medium), an electric current is applied to the conductive coils to induce a magnetic field in the disc under a pole tip of the main pole. By reversing the direction of the current through the coils, the polarity of the data written to the magnetic storage medium is reversed, and a magnetic transition is written between two adjacent bits of the magnetic storage medium.

The slider includes a slider body (typically called the "substrate") and an overcoat that includes the transducing head. The slider body and the overcoat are typically made of a ceramic material. A plurality of bond pads are formed on the slider, such as at a trailing edge or top surface of the slider, for electrically connecting elements of the transducing head to external circuitry through the overcoat.

During fabrication and operation of a HDD, particles can be generated. The presence of particles in an HDD, particularly metallic particles, is undesirable, and can cause a decrease in HDD performance. One particular problem is that particles can accumulate on surfaces inside the HDD and later shed to the magnetic storage media, increasing a risk of unwanted magnetic erasures. Modern HDDs are much more sensitive to particles than previous-generation HDDs. While there are known solutions for capturing particles and limiting negative effects of particles present within HDDs, it is desirable to limit the creation of particles rather than merely redress the presence of particles already created.

The present invention provides an HGA that helps reduce a risk of particle generation.

SUMMARY

A head gimbal assembly according to the present invention includes a gimbal, a slider, and a polymer layer. The gimbal comprises a metal layer, and the metal layer of the gimbal defines a gimbal mounting portion for attachment to a metallic load beam and a gimbal tongue extending from the gimbal mounting portion. The slider comprises a ceramic material for carrying a transducing head, and at least a portion of the slider is secured to the gimbal tongue. The polymer layer is positioned adjacent to the gimbal and configured for limiting ceramic-to-metal and metal-to-metal contact.

DETAILED DESCRIPTION

In general, the present invention provides features for a suspension assembly of a hard disc drive (HDD) to reduce a risk of particle generation. Unwanted particles in an HDD can be generated in many ways during fabrication and operation of the drive. For example, during head stack assembly of a HDD, a flexure of a gimbal can occur, causing the slider to contact the load beam. Shock to the HDD, whether operational or non-operational, can also produce such unwanted contact. Physical contact between a relatively hard ceramic material of the slider and the metallic material of the load beam often causes scratches in load beam, which can generate metallic particles. According to an embodiment of the present invention, a polymer layer can be positioned adjacent to a gimbal carrying a slider. This polymer layer can help reduce a risk that the relatively hard material of the slider or the gimbal will contact the load beam, and thereby reduces a risk of generating particles, particularly hard metallic particles.

Figure 1:
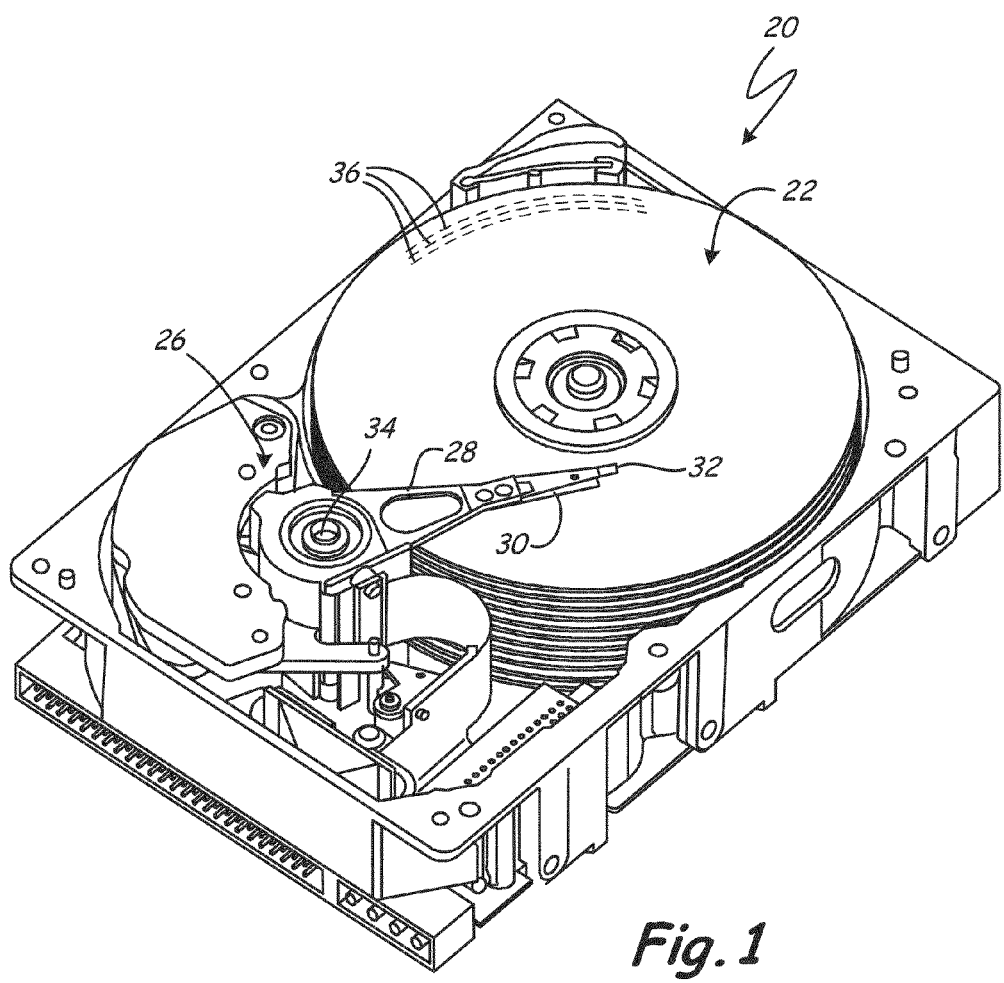
FIG. 1 is a perspective view of an exemplary hard disc drive (HDD) system.

FIG. 1 is a perspective view of an exemplary HDD system 20 that includes a magnetic storage disc 22 configured to rotate about an axis 24, an actuation motor 26 (e.g., a voice coil motor), an actuator arm 28, a suspension assembly 30, and a slider 32 carrying a transducing head. The slider 32 is supported by the suspension assembly 30, which in turn is supported by the actuator arm 28. The actuation motor 26 is configured to pivot the actuator arm 28 about an axis 34. The transducing head carried by the slider 32 can be positioned relative to selected concentric data tracks 36 of the disc 22, for reading from and writing to the disc 22. It should be noted that one or more co-rotating discs 22 can be provided in the HDD system 20.

Figure 2:
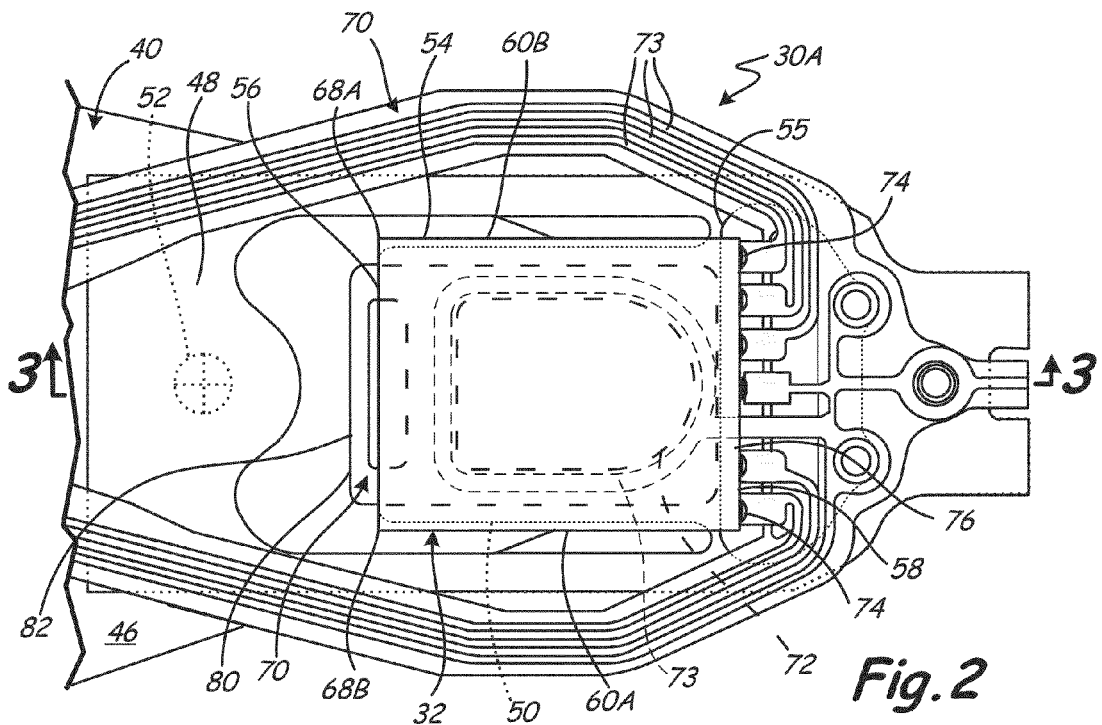
FIG. 2 is a bottom view of a portion of one embodiment of a suspension assembly according to the present invention.
Figure 3:
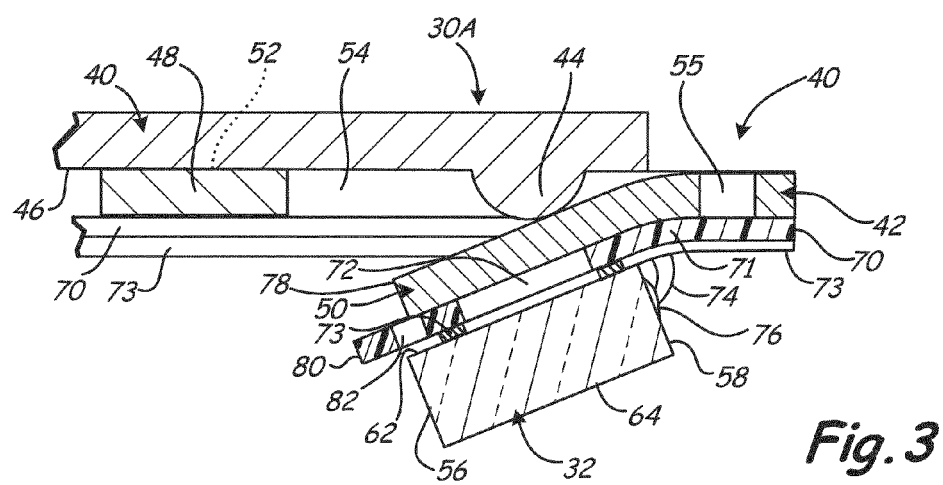
FIG. 3 is a cross-sectional view of the portion of the suspension assembly of FIG. 2, taken along line 3-3.

FIGS. 2 and 3 illustrate one embodiment of a suspension assembly 30A. FIG. 2 is a bottom, air bearing surface (ABS) view of a portion of one embodiment of the suspension assembly 30A, and FIG. 3 is a cross-sectional view of the portion of the suspension assembly 30A, taken along line 3-3 of FIG. 2. The suspension 30 and the slider 32 are collectively referred to as a head gimbal assembly (HGA). The suspension assembly 30A shown in FIGS. 2 and 3 includes the slider 32, a load beam 40, and a gimbal 42.

The load beam 40 is an elongate member with a generally convex load button 44 of a conventional configuration protruding from a first side 46, which is arranged to face the disc 22 (not shown in FIGS. 2 and 3). The load beam 40 can have essentially any desired configuration, and can vary for particular applications. The load beam 40 of the illustrated embodiment comprises a metallic material, such as stainless steel.

The gimbal 42 includes a mounting portion 48 and a gimbal tongue portion 50. The mounting portion 48 of the gimbal 42 can be secured to the first side 46 of the load beam 40 with a weld 52. In alternative embodiments, the gimbal 42 can be secured to the load beam 40 with adhesive, or by other suitable means. The mounting portion 48 can be formed as a generally planar structure defining a first opening 54 in a generally central region of the mounting portion 48, and a second opening 55. The mounting portion 48 surrounds the gimbal tongue 50, which extends into the first opening 54 in a cantilevered configuration. The gimbal tongue 50 can be integrally formed with the mounting portion 48. Typically, the gimbal 42 is formed from a single piece of sheet metal (e.g., stainless steel), such as with a stamping operation that can simultaneously form the mounting portion 48 and the gimbal tongue 50 from a single, continuous piece of material. The gimbal tongue 50 is able to resiliently flex relative to the mounting portion 48.

The slider 32 is generally shaped like a rectangular box and defines a leading edge 56 and an opposite trailing edge 58, a pair of opposite side edges 60A and 60B, and a top surface 62 and an opposite ABS 64. At least a portion of the slider 32, typically the top surface 62, is secured to a first side 66 of the gimbal tongue 50. The slider 32 can be attached to the gimbal tongue 50 with an adhesive or by other means. Flexure of the gimbal tongue 50 allows for pitch and roll movement of the slider 32. The slider 32 is made from a ceramic material, which is a relatively hard material. It should be noted that in FIG. 3 the slider 32 is represented as a solid body for simplicity, though the slider 32 can carry a transducing head (not shown).

A polymer layer 70 extends along a first face 71 of the gimbal 42 facing the load beam 40. The polymer layer 70 can comprise a stand-alone flex circuit, or can be directly deposited upon components of the suspension assembly 30A. In the illustrated embodiment, the polymer layer 70 extends over most of the gimbal tongue 50, though an opening 72 can be formed in the polymer layer 70 to allow adhesive to extend between the slider 32 and the gimbal tongue 50. The polymer layer 70 acts as an electrically insulative layer upon which electrically conductive traces 73 can be deposited, which are used to electrically connect the transducing head carried by the slider 32 to other components of the HDD system 20 in remote locations. The traces 73 can comprise a metallic material, such as copper. An electrically insulative overcoat or cover coat (not shown) can optionally be deposited over the top of the traces 73. In the illustrated embodiment, conventional solder connections 74 are shown between the traces 73 and pads 76 on the trailing edge 58 of the slider 32. At least one of the traces 73 extends along the polymer layer 70 between the gimbal tongue 50 and the top surface 62 of the slider 32 in the illustrated embodiment. In alternative embodiments, other traces 73 can continue along the polymer layer 70 between the gimbal tongue 50 and the top surface 62 of the slider 32 and some or all of the solder connections 74 can be relocated relative to the top surface 62 of the slider 32, such as in embodiments where the slider 32 includes top bond pads (e.g., those disclosed in commonly-assigned U.S. Pat. App. Pub. No. 2007/0274005 entitled "Top Bond Pad For Transducing Head Interconnect").

The gimbal tongue 50 defines a distal end 78, located proximate the leading edge 56 of the slider 32. The polymer layer 70 includes a portion 80 that extends beyond the distal end 78 of the gimbal tongue 50. In the illustrated embodiment, the portion 80 of the polymer layer 70 also extends beyond the leading edge 56 of the slider. The portion 80 of the polymer layer 70 can have a cantilevered configuration. An opening 82 can be formed in a central region of the portion 80 of the polymer layer 70. In the illustrated embodiment, the opening 82 is generally rectangular in shape with rounded corners, and is aligned with the leading edge 56 of the slider such that a portion of the opening 82 extends beyond the leading edge 56 and a portion of the opening 82 is recessed from the leading edge 56. The opening 82 can have an elongate shape, with a longer dimension arranges substantially parallel to the distal end 78 of the gimbal tongue 50 (see FIG. 2). The opening 82 can act as a vent to allow airflow and particle movement through the polymer layer 70 to reduce a risk of a relatively slow-moving, high pressure airflow region developing at that location, which would tend to slow the movement of particles carried in an airflow and lead to undesirable particle accumulation.

The portion 80 of the polymer layer 70 helps to reduce a risk of particle generation, which can be especially problematic during assembly of the HDD 20 prior to operation. For instance, during head stack assembly it is possible for movement of the gimbal tongue 50 and the slider 32 to occur, in a way that is less likely to occur during normal operation of the HDD system 20. With prior art suspensions, such movement often caused the relatively hard ceramic material of the slider to contact the metallic material of the load beam through an opening in the gimbal, leading to scratches on the load beam and the generation of metallic particles. However, the portion 80 of the polymer layer 70 essentially provides a barrier that reduces or eliminates contact between the ceramic material of the slider 32 and the metallic material of the load beam 40. Polymer-on-metal contact between the polymer layer 70 and the load beam 40 is less likely to generate particles than ceramic-on-metal or even metal-on-metal contact, because polymers generally have substantially lower hardness values than both ceramics and metals. Furthermore, any particles that are created by polymer-on-metal contact would tend to be only polymer particles, which are relatively soft and less likely to interfere with operation of the HDD system 20 than other types of particles, like metal particles.

Figure 4:
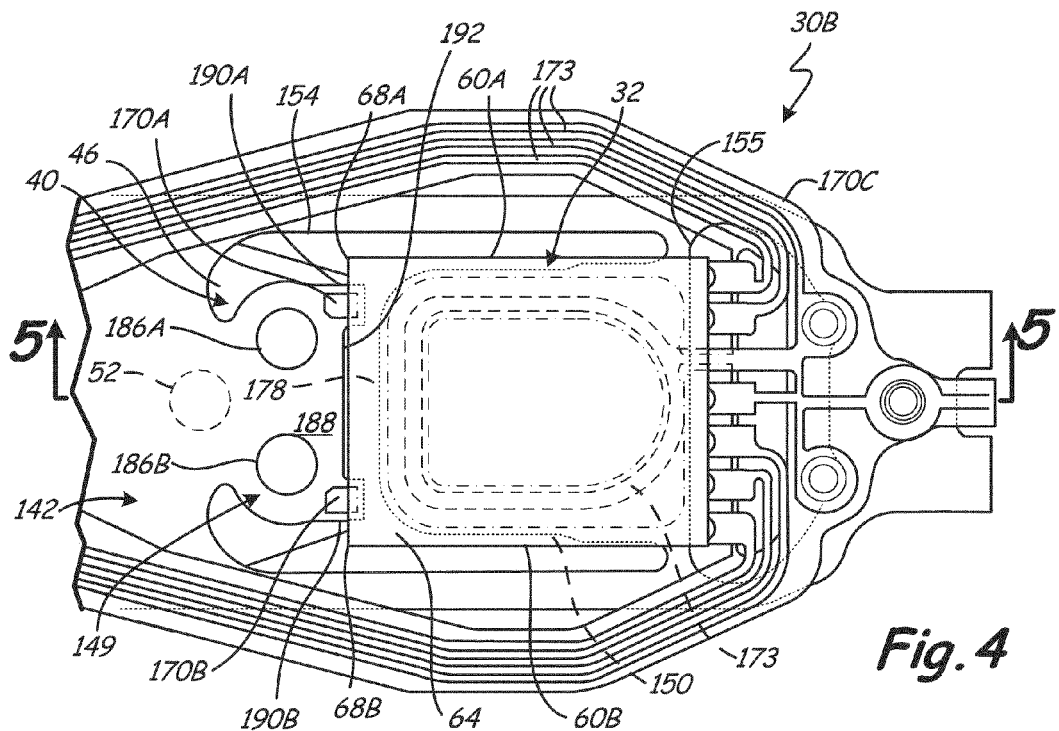
FIG. 4 is a bottom view of a portion of another embodiment of the suspension assembly according to the present invention.
Figure 5:
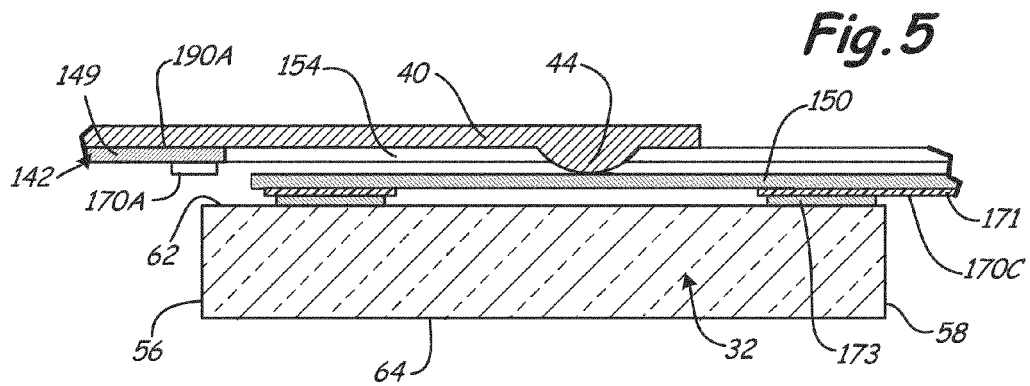
FIG. 5 is a cross-sectional view of the portion of the suspension assembly of FIG. 4, taken along line 5-5.
Figure 6:
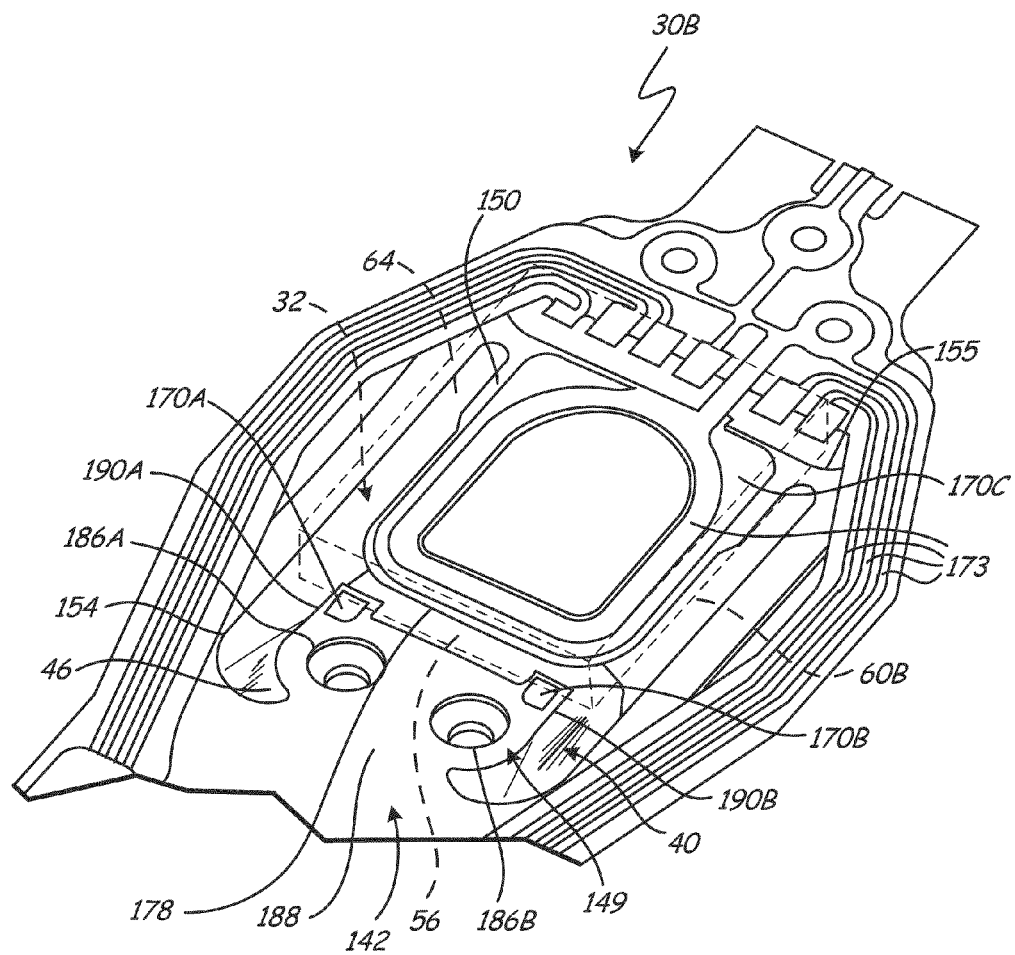
FIG. 6 is a perspective view of the portion of the suspension assembly of FIGS. 4 and 5.

FIGS. 4-6 illustrate another embodiment of a suspension assembly 30B. FIG. 4 is a bottom, ABS view of the portion of the suspension assembly 30B, FIG. 5 is a cross-sectional view of the portion of the suspension assembly 30B taken along line 5-5 of FIG. 4, and FIG. 6 is a perspective view of the portion of the suspension assembly 30B. The suspension assembly 30B includes the slider 32, the load beam 40, and a gimbal 142. The slider 32 is shown in phantom in FIG. 6. It should be noted that in FIG. 5 the slider 32 is represented as a solid body for simplicity, though the slider 32 can carry a transducing head (not shown).

The gimbal 142 includes a mounting portion 148, an extension 149, and a gimbal tongue 150. The mounting portion 148 of the gimbal 142 can be secured to the first side 46 of the load beam 40 with a weld 52, or by other suitable means in alternative embodiments. The mounting portion 148 can be formed as a generally planar structure defining a first opening 154 in a generally central region of the mounting portion 148, and a second opening 155. The mounting portion 148 surrounds the gimbal tongue 150, which extends into the first opening 154 in a cantilevered configuration. The gimbal tongue 150 can be integrally formed with the mounting portion 148, and is able to resiliently flex relative to the mounting portion 148. In the illustrated embodiment, the gimbal tongue 150 has a generally rectangular shape, and is recessed from the leading edge 56 of the slider 32 in a conventional configuration, that is, the leading edge 56 of the slider 32 extends beyond the gimbal tongue 150 into the first opening 154.

A polymer layer (collectively referred to as polymer layer 170) is positioned adjacent to a first face 171 of the gimbal 142. The polymer layer 170 includes first and second pads 170A and 170B, as well as circuit insulator portion 170C. Electrically conductive traces 173 can be deposited on the circuit insulator portion 170C in a conventional manner for electrically connecting the slider 32 to other components of the HDD system 20. The pads 170A and 170B are spaced from the circuit insulator portion 170C, and are secured to the extension 149, as described further below.

The extension 149 extends from the mounting portion 148 into the first opening 154 and toward a distal end 178 of the gimbal tongue 150. First and second openings 186A and 186B can be provided to secure the extension 149 to the load beam 40. In the illustrated embodiment, the extension 149 defines a body portion 188 and generally rectangular first and second tabs 190A and 190B, respectively, that extend from the body portion 188 toward the gimbal tongue 150. The tabs 190A and 190B can be spaced apart, with a cutout channel 192 formed therebetween. The extension 149 can be integrally formed with the mounting portion 148, including integral formation of the body portion 188 and the tabs 190A and 190B. The first and second pads 170A and 170C of the polymer layer 170 are located on the first and second tabs 190A and 190B, respectively. At least portions of the tabs 190A and 190B and the pads 170A and 170B extend past the leading edge 56 of the slider 32. The positioning of the tabs 190A and 190B and the pads 170A and 170B relative to the slider 32 can vary as desired for particularly applications, and may vary due to normal manufacturing tolerances. In embodiments where the gimbal 142 is formed from a single piece of sheet metal with a stamping operation, the first opening 154 will generally define a gap between the tabs 190A and 190B and the gimbal tongue 150.

The extension 149 and the polymer pads 170A and 170B located thereon help to reduce a risk of particle generation. The extension 149 and the polymer pads 170A and 170B essentially provide a barrier that reduces or eliminates contact between the ceramic material of the slider 32 and the metallic material of the load beam 40. The pads 170A and 170B can be arranged such that an edge of the slider 32 where the leading edge 56 and the top surface 62 meet contacts the pads 170A and 170B if the distal end 178 of the gimbal tongue 150 is deflected significantly toward the load beam 40. Polymer-on-ceramic contact between the polymer pads 170A and 170B and the slider 32 is less likely to generate particles than ceramic-on-metal contact, and any polymer particle generated are less problematic than other types of particles, as discussed above. In alternative embodiments, the tabs 190A and 190B can be omitted, with pads 170A and 170B located on the body 188 of the extension 149.

Figure 7:
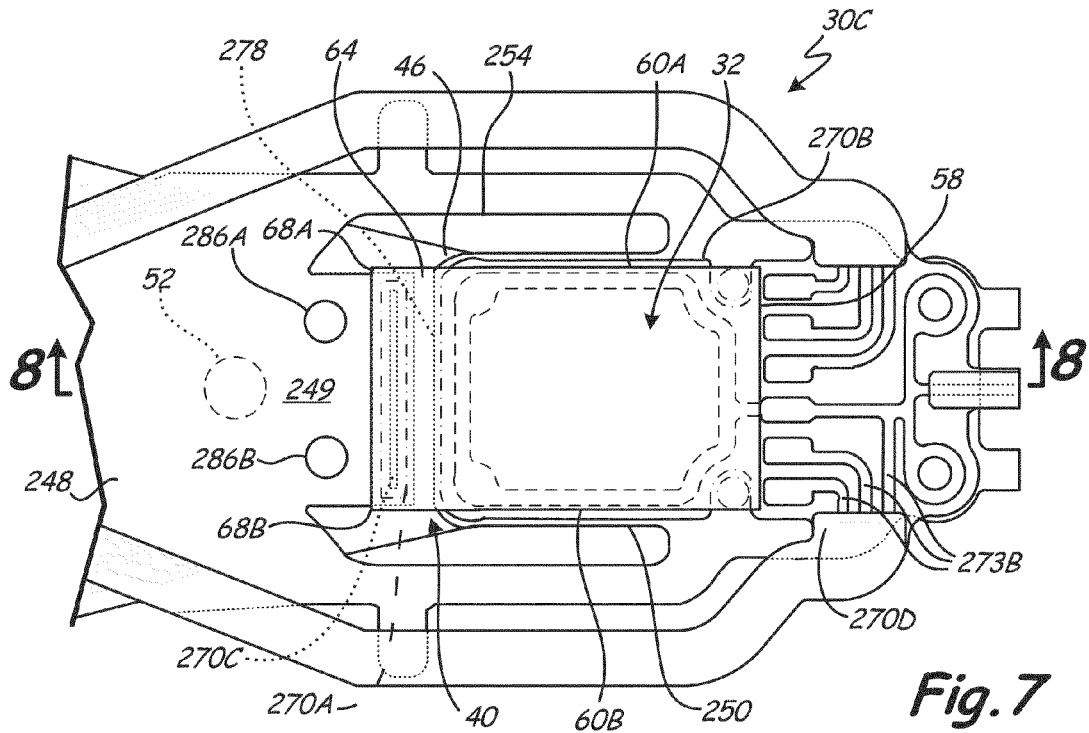
FIG. 7 is a bottom view of a portion of yet another embodiment of the suspension assembly according to the present invention.
Figure 8:
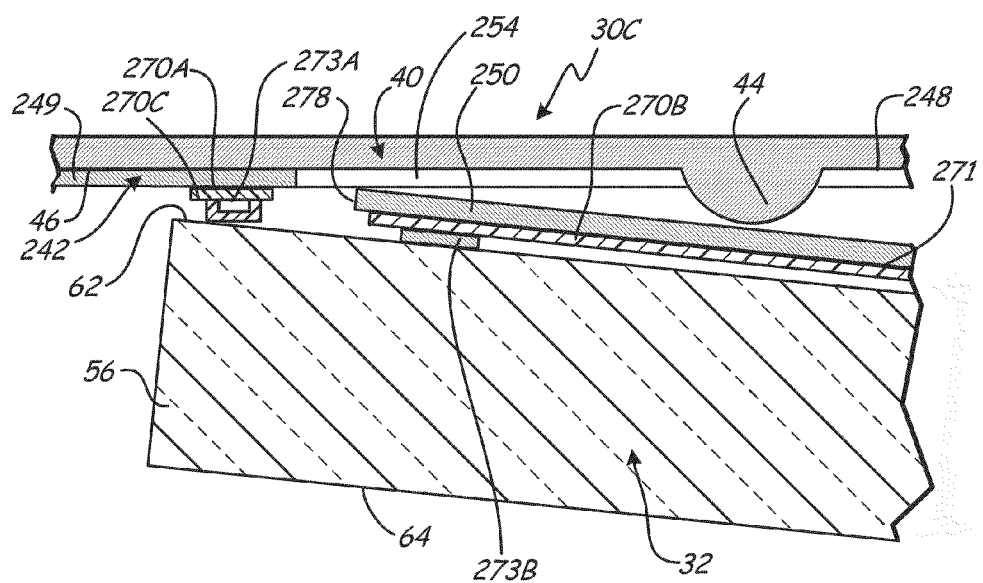
FIG. 8 is a cross-sectional view of the portion of the suspension assembly of FIG. 7, taken along line 8-8.
Figure 9:
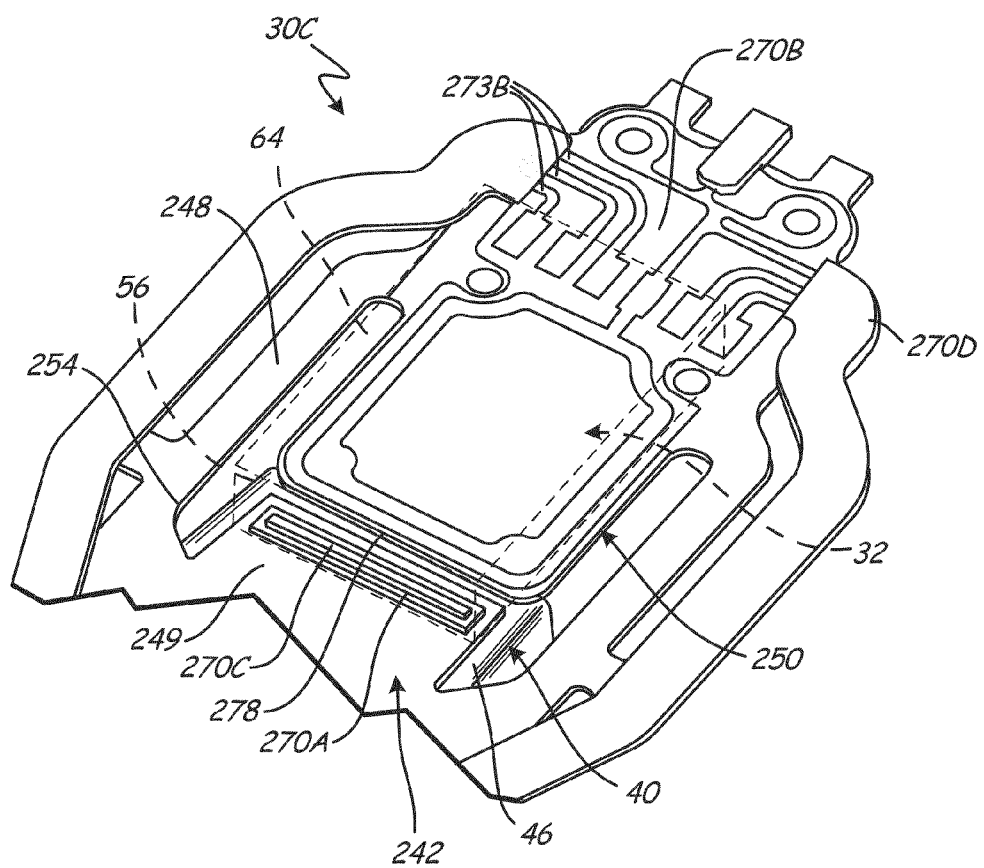
FIG. 9 is a perspective view of the portion of the suspension assembly of FIGS. 7 and 8.

FIGS. 7-9 illustrate yet another embodiment of a suspension assembly 30C. FIG. 7 is a bottom, ABS view of the portion of the suspension assembly 30C, FIG. 8 is a cross-sectional view of the portion of the suspension assembly 30C taken along line 8-8 of FIG. 7, and FIG. 9 is a perspective view of the portion of the suspension assembly 30C. The suspension assembly 30C includes the slider 32, the load beam 40, and a gimbal 242. It should be noted that in FIG. 8 the slider 32 is represented as a solid body for simplicity, though the slider 32 can carry a transducing head (not shown).

The gimbal 242 includes a mounting portion 248, an extension 249, and a gimbal tongue 250. The mounting portion 248 of the gimbal 242 can be secured to the first side 46 of the load beam 40 with a weld 52, or by other suitable means in alternative embodiments. The mounting portion 248 can be formed as a generally planar structure defining an opening 254 in a generally central region of the mounting portion 248. The mounting portion 248 surrounds the gimbal tongue 250, which extends into the opening 254 in a cantilevered configuration. The gimbal tongue 250 can be integrally formed with the mounting portion 248, and is able to resiliently flex relative to the mounting portion 248. In the illustrated embodiment, the gimbal tongue 250 has a generally rectangular shape, and is recessed from the leading edge 56 of the slider 32 in a conventional configuration, that is, the leading edge 56 of the slider 32 extends beyond the gimbal tongue 250 into the first opening 254. Sides of the gimbal tongue 150 protrude past the side edges 60A and 60B of the slider 32.

A polymer layer (collectively referred to as polymer layer 270) is positioned adjacent to a first face 271 of the gimbal 242. The polymer layer 270 includes a strip 270A, a circuit insulator portion 270B, and a cover portion 270C. Electrically conductive traces (collectively referred to as traces 273) can be deposited on the strip 270A and the circuit insulator portion 270B in a conventional manner. The traces 273 include a trace strip 273A and connecting traces 273A, which can electrically connect the slider 32 to other components of the HDD system 20. The strip 270A can be spaced from the circuit insulator portion 270B, and is secured to the extension 249. The strip 270A can have a substantially rectangular shape, or shapes as desired for particular applications. The trace strip 273A can be deposited in a generally central portion of the polymer strip 270A, and the polymer cover portion 270C deposited over the trace strip 273A. In this way, the trace strip 273A can be covered by polymer material, such that material of the trace strip 273A is not exposed. The polymer material of the cover portion 270C can be the same or a different composition than that of the polymer strip 273A. Another polymer cover portion 270D can be disposed over the traces 273B on the circuit insulator portion 270B.

The extension 249 extends from the mounting portion 248 into the opening 254 and toward a distal end 278 of the gimbal tongue 250. In the illustrated embodiment, the extension 249 has a generally rectangular shape. First and second openings 286A and 286B can be provided to secure the extension 249 to the load beam 40. The extension 249 can be integrally formed with the mounting portion 248. The strip 273A on the polymer layer 270 is located on the extension 249, and is oriented substantially parallel to the leading edge 56 of the slider 32. At least a portion of the extension 249 extends past the leading edge 56 of the slider 32, and the polymer strip 270A can be positioned past the leading edge 56 of the slider 32 (i.e., over a portion of the top surface 62 of the slider 32). The positioning of the extension 249 and the polymer strip 270A relative to the slider 32 can vary as desired for particularly applications, and may vary due to normal manufacturing tolerances. In embodiments where the gimbal 242 is formed from a single piece of sheet metal with a stamping operation, the opening 254 will generally define a gap between extension 249 and the gimbal tongue 250.

The extension 249 and a pad subassembly defined by the polymer strip 270A, the trace strip 273A, and the polymer cover portion 273C located thereon help to reduce a risk of particle generation. The extension 249 and the pad subassembly defined by the polymer strip 270A, the trace strip 273A, and the polymer cover portion 273C essentially provide a barrier that reduces or eliminates contact between the ceramic material of the slider 32 and the metallic material of the load beam 40. The pad subassembly can be arranged such that the top surface 62 of the slider 32 contacts the polymer cover portion 270C if the distal end 278 of the gimbal tongue 250 is deflected significantly toward the load beam 40, as shown in FIG. 8. Polymer-on-ceramic contact between the polymer cover portion 270C and the slider 32 is less likely to generate particles than ceramic-on-metal contact, and any polymer particles generated are less problematic than other types of particles, as discussed above. In alternative embodiments, the trace strip 273A can be omitted. However, the presence of the trace strip 273A can help increase a thickness of the pad subassembly, placing the cover portion 273C further from a surface of the extension 249, which can reduce a risk that the slider 32 will contact the extension 249 or any other metallic materials.

It will be recognized that the present invention provides numerous benefits and advantages. For instance, the present invention provides a suitable balance between a number competing design parameters and operational conditions such as particle generation, particle accumulation, and manufacturing/assembly tolerances.

Although the present invention has been described with reference to preferred embodiments, workers skilled in the art will recognize that changes may be made in form and detail without departing from the spirit and scope of the invention.

The invention claimed is:

1. A head gimbal assembly comprising:
   a metallic load beam;
   a gimbal comprising a metal layer, wherein the metal layer of the gimbal defines a gimbal mounting portion attached to the load beam and a gimbal tongue extending from the gimbal mounting portion and configured to resiliently flex relative to the gimbal mounting portion;
   a slider comprising a ceramic material for carrying a transducing head, wherein at least a portion of the slider is secured to the gimbal tongue; and
   a polymer layer positioned adjacent to the gimbal and extending beyond a distal end of the gimbal tongue so as to prevent ceramic-to-metal contact between the slider and the load beam and metal-to-metal contact between the distal end of the gimbal tongue and the load beam.

2. The assembly of claim 1, wherein the polymer layer is secured to the gimbal tongue and forms cantilevered portion in relation to the load beam.

3. The assembly of claim 2, wherein the cantilevered portion of the polymer layer extends beyond a leading edge of the slider.

4. The assembly of claim 2 and further comprising:
   an opening formed in the polymer layer, wherein the opening is defined through the polymer layer located at least partially within the cantilevered portion.

5. The assembly of claim 1, wherein the gimbal tongue is integrally formed with the gimbal mounting portion.

6. The assembly of claim 1, wherein the gimbal is formed from a single, continuous piece of material.

7. A head gimbal assembly comprising:
   a load beam;
   a gimbal, wherein the gimbal defines to gimbal mounting portion attached to the load beam and a gimbal tongue extending from the gimbal mounting portion and configured to resiliently flex relative to the gimbal mounting portion;
   a slider for carrying a transducing head, wherein at least a portion of the slider is secured to the gimbal tongue; and
   a polymer layer secured to and extending, beyond, a distal end of the gimbal tongue so as to prevent contact between the distal end of the gimbal tongue and the load beam and between the slider and the load beam.

8. The assembly of claim 7, wherein the polymer layer forms a cantilevered portion in relation to the load beam, wherein the cantilevered portion of the polymer layer extends beyond a leading edge of the slider.

9. The assembly of claim 8, wherein an opening is defined through the polymer layer located at least partially within the cantilevered portion.

10. The assembly of claim 7, wherein the gimbal defines an extension extending from the gimbal mounting portion toward the gimbal tongue, wherein the polymer layer is secured to the extension.

11. The assembly of claim 10, wherein the polymer layer defines a plurality of discrete pads.

12. The assembly of claim 10 and further comprising:
   an insulator layer; and
   an electrical conductor layer deposited on the insulator layer, wherein the electrical conductor layer is positioned in between the polymer layer and the insulator layer.

13. The assembly of claim 12, wherein the insulator layer comprises a polymer.

14. The assembly of claim 12, wherein the electrical conductor layer comprises copper.

15. The assembly of claim 10 and further comprising:
   an opening formed in the extension from the gimbal mounting portion.

16. The assembly of claim 10, wherein the extension comprises a body portion and a plurality of tabs extending from the body portion toward the gimbal tongue.

17. The assembly of claim 16, wherein the polymer layer comprises a plurality of discrete pads, and wherein one or more of the plurality of discrete pads is located on each of the plurality of tabs extending from the body portion of the extension.

18. The assembly of claim 7, wherein the gimbal tongue is integrally formed with the gimbal mounting portion.

19. The assembly of claim 7, wherein the gimbal is formed from a single, continuous piece of material.

* * * * *